Feb. 16, 1932.  W. R. SCHINDLER  1,844,982
SANITARY CUSPIDOR
Filed Sept. 20, 1929

Inventor
Walter R. Schindler
By
Lyon & Lyon
Attorneys

Patented Feb. 16, 1932

1,844,982

UNITED STATES PATENT OFFICE

WALTER R. SCHINDLER, OF LOS ANGELES, CALIFORNIA

SANITARY CUSPIDOR

Application filed September 20, 1929. Serial No. 393,983.

This invention relates to sanitary cuspidors and, more especially, to that type provided with a hinged cover and mechanism, operable by the foot, to open and close the cover.

The type of cuspidor to which this invention relates also includes a removable bowl and a paper cup or container nesting within said bowl so that the contents of the container can be readily discharged from the container by removing the bowl from its support together with the paper container and discharging said container with its contents from the bowl by tilting said bowl.

An object of the invention, in general, is the improvement of cuspidors of this type.

Another object is to provide a construction of container that will obviate, to a relatively large extent, splashing out of the liquid from the container when the container is moved about as, for example, when the container is removed with the bowl for emptying or when the support is slid along the floor from place to place. Cuspidors are frequently shoved with the foot to move them from one place to another and, accordingly, there is a tendency to splashing out of the liquid contents.

Other objects and advantages will appear in the subjoined detailed description.

The accompanying drawings illustrate the invention.

Figure 1:
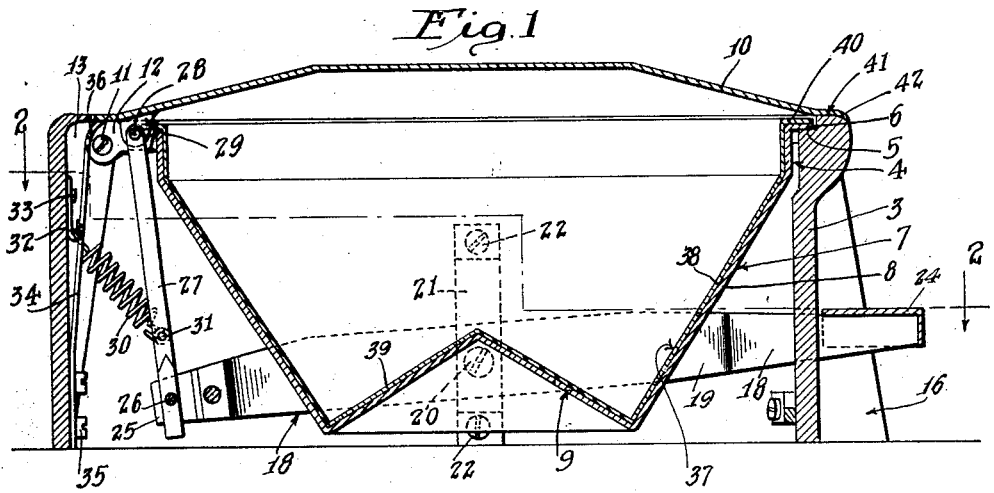
Fig. 1 is a vertical view, mainly in midsection, of a sanitary cuspidor constructed in accordance with the provisions of this invention.
Figure 2:
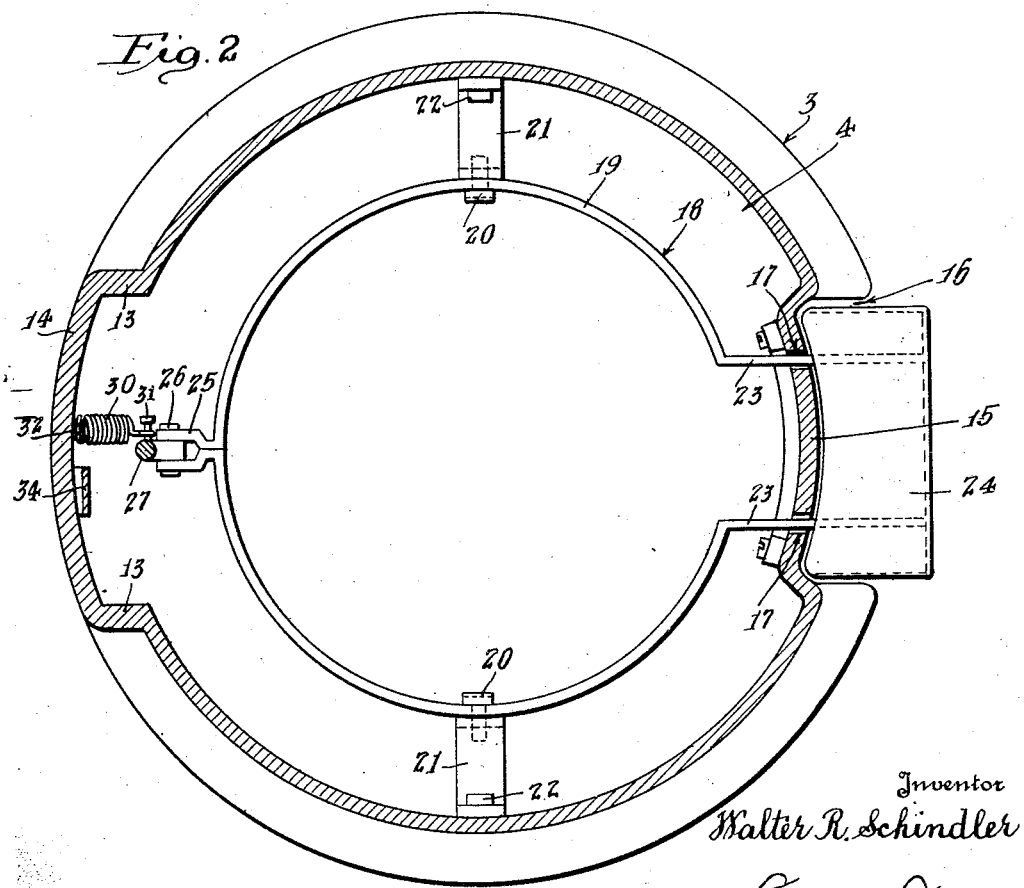
Fig. 2 is a horizontal section on the irregular line indicated by 2—2, Fig. 1.

Referring to the drawings, there is provided a hollow or tubular member or support 3 having an opening 4 at its upper end. The support 3 is provided with an internal annular ledge 5 on which is adapted to seat the annular outstanding flange 6 of a bowl 7 so as to support said bowl within the support 3.

The bowl 7 has a downwardly reduced or tapered portion 8 and a conical bottom 9.

There is provided a cover 10 to close the opening 4 and said cover is hinged at 11 to the support 3. The hinge pivots 11 pass through downwardly projecting ears 12 of the cover and through outwardly extending vertical offsets 13 of the support 3. The cover 10 is preferably convex.

Except for the wall portion 14 between the offsets 13 and for the inner wall 15 of a recess 16, the other wall portions of the support 3 preferably extend aslant outwardly and downwardly. The recess 16 is positioned opposite to the wall portion 14 and said wall 15 is provided with a pair of vertical slots 17 to accommodate the arms 18 of a lever, said lever arms having arcuate portions 19 pivoted substantially midway at 20 to U-shaped brackets 21 that are secured by screws 22 or their equivalents to the inner face of the support 3. The lever 18 thus encircles the lower portion of the bowl 7 so that said bowl can be made of a depth almost equal to the height of the support 3.

The lever arms 18 are provided with straight portions 23, said straight portions extending through the slots 17 and being spaced a material distance apart. Secured on the upper faces of the straight lever portions 23 is a tread member 24 adapted to receive pressure from the operator's foot for depression of the forward end of the lever.

The tread member 24 is positioned partly within the recess 16 and projects somewhat outside of said recess. The recess thus permits of a tread member of relatively large dimensions being employed without projecting to an objectionable extent beyond the perimeter of the support 3, thereby obviating any likelihood of any person tripping over the tread member. The rear end of the lever, constituted by a pair of spaced ears 25, is pivoted at 26 to a rod 27, said pivot 26 passing through the ears 25 and through said rod 27. The rod 27 is pivoted at 28 to an ear 29 that projects downwardly from the cover 10 midway between the ears 12.

The weight of the cover 10 is sufficient to overbalance the lever and rod 27 so as to hold the lid closed and move it from open to closed position. To prevent slamming of the cover, I preferably employ a coil spring 30 hooked at one end over a pin 31 in the rod 27 and hooked at its other end over a hook 32 that is secured by a screw 33 or its equivalent to the inner face of the support 3. The spring 30 is contracted when the cover is open, and the tensioning of said spring begins when the cover is about half closed so that when the cover is about to seat upon the support 3 the tension of the spring has increased sufficiently to almost counterbalance the weight of the cover, thereby preventing said cover from striking the support unduly hard.

I preferably aid the initial movement of the cover from full opened position toward the closed position by a flat spring 34 which is secured at its lower end by a screw 35 or its equivalent to the inner face of the support 3. The upper end of the spring 34 is provided with an inwardly curved portion 36, which engages the inner face of the cover at a point between the hinge pins 11 and rearwardly of said hinge pins, when the cover is closed. This spring 34 has practically no pressure upon the cover when the cover is closed but is put into tension by raising of the cover. The springs 30, 34, thus act in opposite directions so as to effect quick closure of the cover without slamming.

Within the bowl 7 is nested a paper container, indicated in general by the character 37. The container 37 has a tapered or downwardly reduced portion 38 that seats in the tapered bowl portion 8. Said container has a conical bottom 39 which seats upon the conical bowl bottom 9. The container is also provided with an annular outstanding flange 40 which seats upon the flange 6. Thus, it will be seen, that the inner face of the bowl is entirely covered by the container 37, thereby maintaining the bowl in a sanitary condition.

The foregoing will make clear the construction and operation of the invention and, briefly stated, the operation is as follows:

When a person desires to use the cuspidor, he places the toe of his shoe on the member 24 and depresses the same, thus causing the cover 10 to rise to its full opened position. Upon releasing pressure from the member 24 the spring 34, which has been put in tension by raising of the cover, operates to quickly move the cover toward its closed position. As the cover moves toward its closed position, it tensions the spring 30 so that by the time said cover is in a position to seat on the support 3, its closing movement has been considerably checked by the spring 30, thus avoiding slamming of the cover.

When the contents of the container are to be discharged, the cover will be raised in the manner hereinbefore mentioned and the bowl will be lifted out of the support with the container and its contents supported by the bowl. The conical bottom 39 will, to a large degree, obviate splashing of the liquid contents of the container in the operations of removing the bowl and transporting it to the place where it is to be emptied. To empty the contents, all that is necessary is to tip the bowl, whereupon the paper container together with the contents thereof will be deposited in a vessel or other place to receive them. The bowl will then be replaced in the support 3 and a new paper container will be placed within the bowl. Thus, washing of the cuspidor is not necessary to maintain it in a sanitary condition.

It will be noted that the edge of the cover 10 overlaps the entire upper face 41 of the support 3, the outer portion of said face 41 extending aslant downwardly and outwardly as does the rim portion 42 of the cover.

I claim:

A sanitary cuspidor comprising a hollow support provided with an opening in its upper end, a bowl within said support, a cover hinged to the support to close over said opening, a lever pivotally mounted in the support, a rod pivotally connected at one end to the lever and at its other end to the cover, a coil spring connected at one end to the support and at the other end to the rod, said spring being under tension when the cover is closed and being contracted when the cover is raised, and a flat spring secured at one end to the support and having its other end engaging the under face of the cover, said flat spring being tensioned by raising of the cover.

Signed at Los Angeles, California, this 7th day of Sept., 1929.

WALTER R. SCHINDLER.